United States Patent [19]

Rafael

[11] 4,328,007
[45] May 4, 1982

[54] APPARATUS FOR GASIFICATION OF FINE-GRAIN COAL

[75] Inventor: Aruth Rafael, Wesel, Fed. Rep. of Germany

[73] Assignee: Deutsche Babcock Aktiengesellschaft, Oberhausen, Fed. Rep. of Germany

[21] Appl. No.: 169,600

[22] Filed: Jul. 17, 1980

[30] Foreign Application Priority Data

Aug. 21, 1979 [DE] Fed. Rep. of Germany ....... 2933716

[51] Int. Cl.³ .............................................. C10J 3/20
[52] U.S. Cl. .......................................... 48/73; 48/77; 122/5; 122/390; 122/392
[58] Field of Search .......................... 48/73, 77, 63, 64; 122/5, 390, 510, 392, 32, 235 A, 235 K; 165/142, 154

[56] References Cited

U.S. PATENT DOCUMENTS

| | | | |
|---|---|---|---|
| 1,722,496 | 7/1929 | Chapman | 122/5 |
| 2,703,559 | 3/1955 | Godshalk | 122/510 |
| 2,811,954 | 11/1957 | Hibner, Jr. et al. | 122/392 |
| 2,851,346 | 9/1958 | Sprague | 48/64 |
| 2,961,310 | 11/1960 | Steever | 48/63 |
| 3,454,383 | 7/1969 | Pirsh et al. | 122/5 |
| 4,098,324 | 7/1978 | Kummel | 122/5 |
| 4,272,255 | 6/1981 | Coates | 48/63 |

FOREIGN PATENT DOCUMENTS 2705558 8/1978 Fed. Rep. of Germany .......... 48/77

*Primary Examiner*—S. Leon Bashore
*Assistant Examiner*—Michael L. Goldman
*Attorney, Agent, or Firm*—Max Fogiel

[57] ABSTRACT

An arrangement for pressure gasification of fine-grain coal in which the exit of a reactor is followed by a waste heat boiler for cooling the generated gas. The waste heat boiler has a radiation section and downstream heat exchanger surfaces. The reactor is provided, furthermore, with cooling cubes which are studded and lined with refractory ramming mix. The radiant type heating surfaces are sized so that the gas temperature at the exit of the radiation section is situated below the ash sintering temperature of the coal being used. On gas sides, the radiation section is followed by a pressure vessel accommodating convection type heating surface banks which are swept by the generated gas. The radiation section may be in the form of two gas passages through which the gas flows successively. These gas passages are formed by the tube walls welded between each other in a gas-type manner.

3 Claims, 3 Drawing Figures

APPARATUS FOR GASIFICATION OF FINE-GRAIN COAL

BACKGROUND OF THE INVENTION

The present invention relates to apparatus for the gasification of fine-grain coal under pressure in a reactor. The latter has an exit which is connected to a waste-heat boiler for cooling the generated gas. The waste-heat boiler has a radiation section and heat exchange surfaces arranged downstream.

In such apparatus there is the danger that the heating surfaces of the waste-heat boiler contaminate quickly by the ash contained in the coal. This contamination deteriorates the heat transfer and, consequently, the cooling of the gas. A known prior art plant has a fire tube boiler which follows the radiation section of the waste heat boiler. In such fire tube boilers the heat of the gases can be reduced only to the temperature of the saturated stream generated in the fire tube boiler. This is the reason why the generated gas leaves the waste heat system at a relatively high temperature.

SUMMARY OF THE INVENTION

The present invention pursues the object of improving an apparatus of the above-described kind, so that the start-up and rundown times may be shortened, the contamination of the heating surfaces will be diminished, and the generated gases may largely be cooled by making use of their heat.

Another object of the present invention is to provide improved apparatus of the foregoing character which is substantially simple in construction and may be economically fabricated.

A further object of the present invention is to provide an arrangement, as described, which may be readily maintained in service and which has a substantially long operating life.

In accordance with the present invention these objects are achieved by providing the reactor with cooling tubes which are studded and lined with refractory ramming mix. The radiant type heating surfaces are sized so that the gas temperature at the exit of the radiation section is situated below the ash sintering temperature of the coal used. A pressure vessel is arranged on the gas side downstream of the radiation section. This pressure vessel accommodates convection type heating surface banks swept by the generated gas. The reactor mass to be heated with the apparatus of the present invention is relatively small in comparison with a fully brickset gasification reactor. For this reason the reactor is very quickly available during start-up and rundown. The application of convection type heating surfaces downstream of the radiation section allows the gas temperature to be largely lowered by making use of the heat contained in the generated gas. The heating surfaces of the radiation section are sized so that the ash will be available in the dry condition. This solid ash can be separated from the gas in a simple manner.

Heating surface contamination, which adversely affects the heat transfer and consequently the cooling of the gas, is largely avoided. In order to facilitate sufficient cooling of the gas within the radiation section, the heating surfaces of this radiation section may be provided with annularly arranged sootblowers. The possibility created in this way for cleaning the radiant type heating surfaces, therefore, always allows a good heat transfer to be achieved. Another advantageous embodiment is possible with the radiation section consisting of two passages through which the gas flows successively and which are formed by tube walls welded between each other in a gas-tight manner. This allows the heating surface to be enlarged within a substantially equal space, as the cooling tubes of the one passage are heated on either side.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
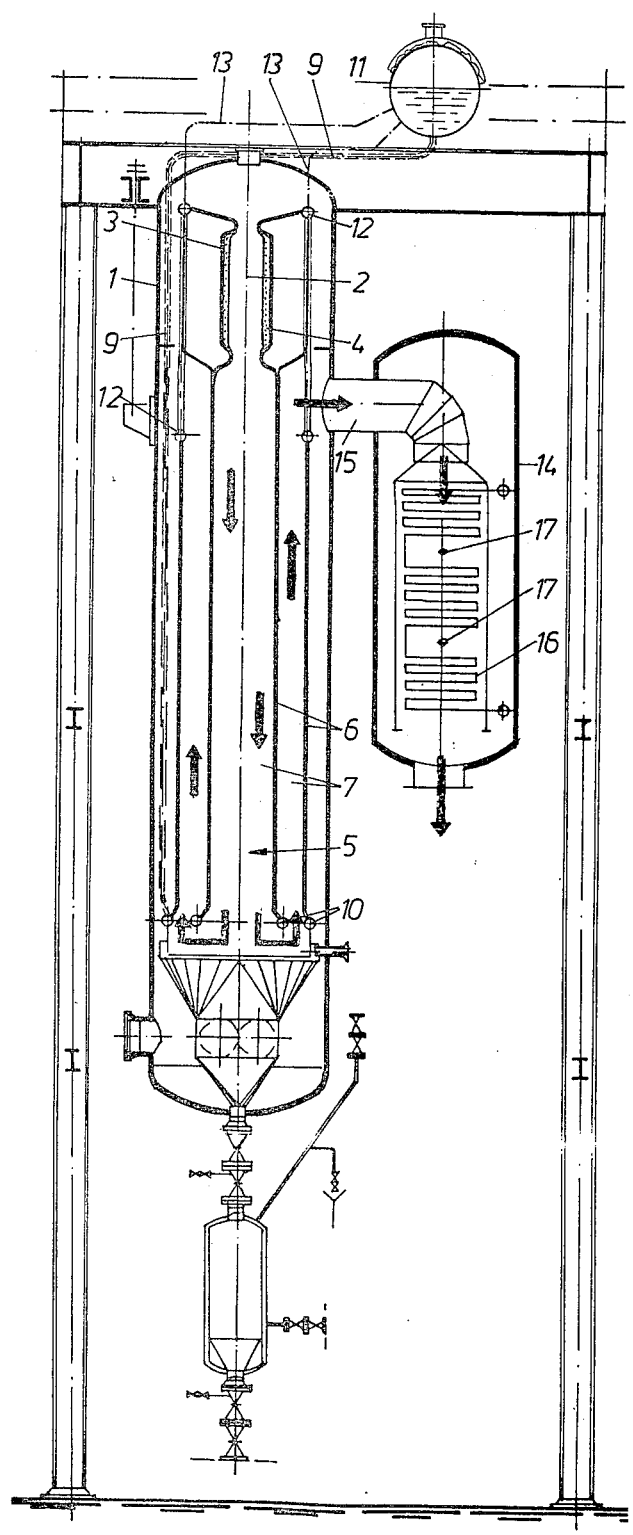
FIG. 1 is a longitudinal section through the apparatus according to the present invention.

The apparatus shown in the drawings serves for the gasification of fine-grain coal at a pressure of 20 to 100 bar. It consists of a cylindrical pressure shell 1 accommodating a gasification reactor 2 within its top part. In a manner which is not shown, the gasification reactor 2 is supplied with fine-grain coal—in dry condition or as a pulverized coal/water suspension—as well as with a gasification agent at pressure.

The walls of the gasification reactor 2 are formed by cooling tubes 3. The cooling tubes 3 are lined with refractory ramming mix 4. Studs 3a are welded to the cooling tubes 3 for retaining the refractory mix 4 to them.

The gases generated in the gasification reactor 2 are cooled in a waste heat boiler immediately afterwards. The radiation section 5 of the waste heat boiler immediately follows the exit of the gasification reactor 2 and is likewise arranged within the pressure shell 1. The radiation section 5 is provided with tube walls 6 in which the tubes are welded between each other in a gas-tight manner by interposed flats.

The embodiment shown in FIG. 1 has two tube walls 6 which are concentrically arranged. This creates two gas passages 7 through which the generated gas flows successively. The arrows indicate the flow direction of the gas. The gas generated is intensely cooled within a relatively narrow space. By this intense cooling it is possible to lower the temperature of the gas at the exit of the radiation section 5, to a value which is below the ash sintering temperature.

Figure 2:
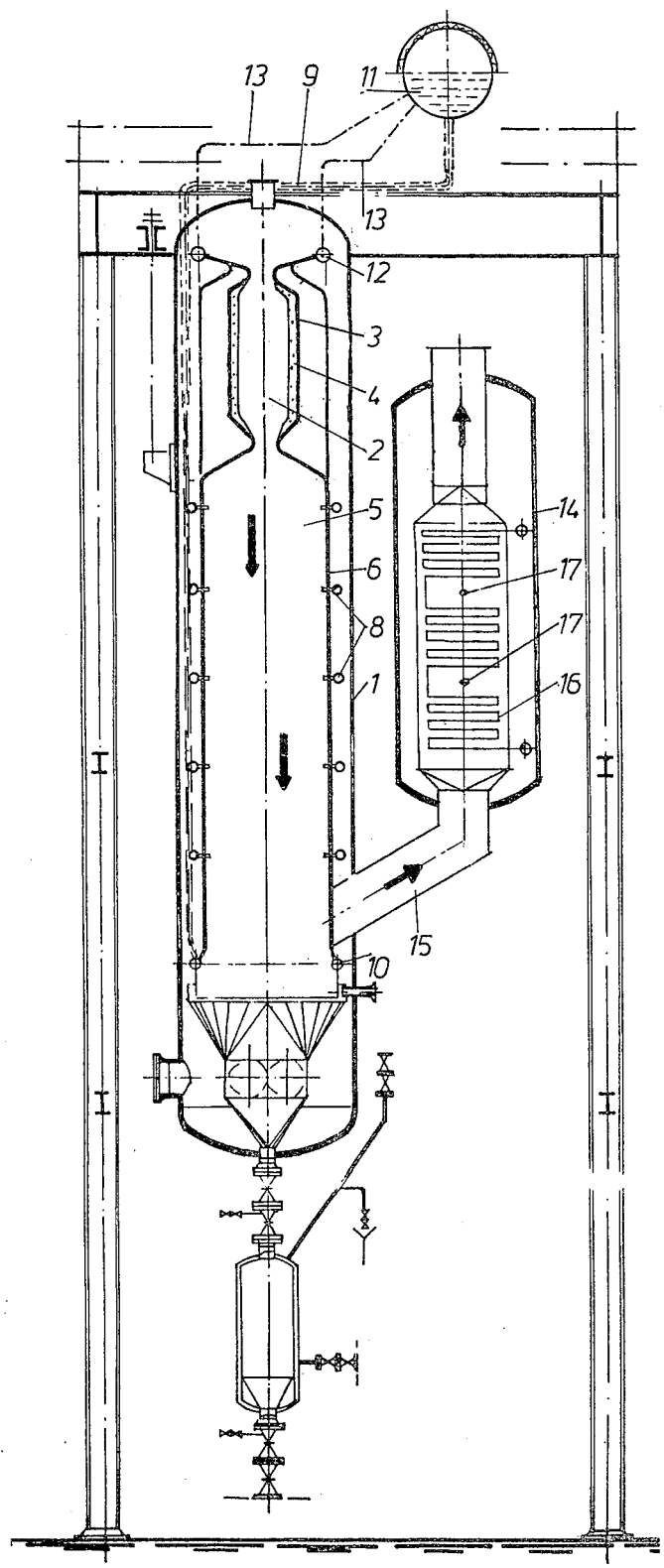
FIG. 2 is a longitudinal section through another embodiment of the present invention.
Figure 3:
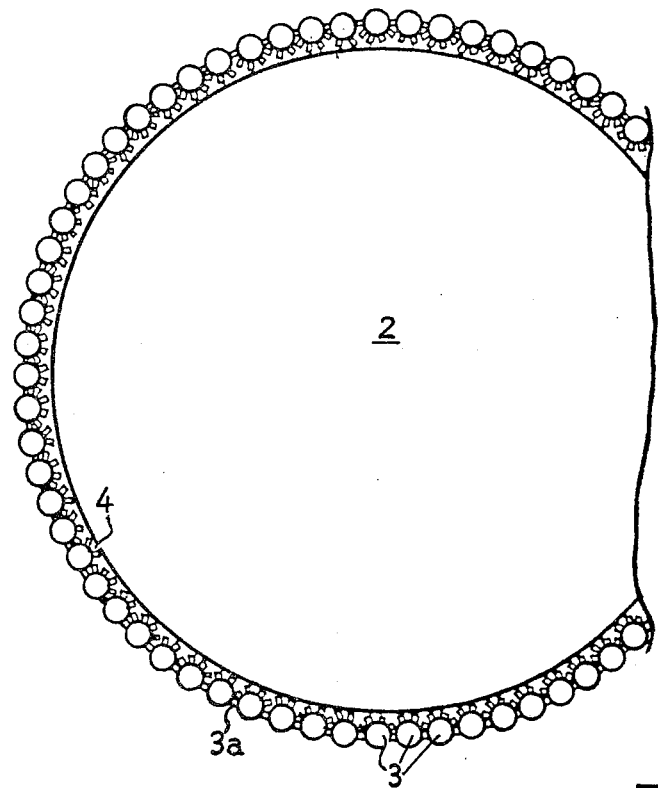
FIG. 3 is a sectional view through the wall of the reactor in FIG. 1, and shows cooling tubes provided with studs.

FIG. 2 shows that the radiation section 5 consists of a single cylindrical tube wall 6. In order to achieve intense cooling here, annularly arranged sootblowers 8 are located at several levels. By means of these annularly arranged sootblowers 8, the inside of the tube wall 6 will be kept free from contamination. This is the reason why the heating surfaces will always be largely clean and will thus ensure a good heat transfer. The gas generated will be slightly diluted by the steam blown in through the sootblowers 8. When such a dilution is not desired, preference must be given to the embodiment shown in FIG. 1; but it should be noted that such an embodiment requires slightly higher capital expenditure.

The cooling tubes 3 of the gasification reactor 2 and the tubes of the tube walls 6 are fed through downcomers 9 and through lower annular headers 10 from the steam drum 11 of the waste heat system. The upper annular headers 12 of the cooling tubes 3 and the tube walls 6 are connected with the steam drum 11 through risers 13.

The generated gases having left the radiation section 5 are supplied to a pressure vessel 14 which is connected with the inside of the pressure shell 1 through piping 15. Convection type heating surfaces having the form of rectangular tube banks 16 are arranged inside of the pressure vessel 14, and are swept by the generated gas on the outside. In the present embodiment the tube banks 16 are arranged as feedwater preheaters. They are equipped with longitudinally shiftable sootblowers 17.

The dry ash obtained in the radiation section 5 of the waste heat boiler is collected in hoppers 18 which are arranged inside of the pressure shell 1. The ash is extracted by way of a pressure lock 19 outside of the pressure shell 1.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. Apparatus for pressure gasification of fine-grain coal, comprising: a reactor having an exit followed by a waste heat boiler, for cooling generated gas; said waste heat boiler having a radiation section and downstream heat exchanger surfaces; said reactor having cooling tubes with studs and linked with refractory ramming mix; radiant type heating surfaces being sized so that the gas temperature at the exit of the radiation section is situated below the ash sintering temperature of the coal used; a pressure vessel following said radiation section; said pressure vessel accommodating convection type heating surface banks which are swept by the generated gas; said radiation section comprising two gas passages, both extending substantially through said radiation section through which gas flows in sequence, said passages being formed by two concentrically arranged tube walls formed by tubes welded between each other in a gas-tight manner, said passages arranged so that gas travels from the reactor downwardly within the inner tube and then upwardly through the passage between the two tube walls to said pressure vessel; said refractory ramming mix being applied to said tubes and being held in place by studs.

2. Apparatus as defined in claim 1 wherein said radiation section having heating surfaces with annularly arranged sootblowers located at a plurality of levels for retaining the tube walls forming said two gas passages free of contamination and thereby provide increased heat transfer characteristics; downcomers for feeding said cooling tubes and said two concentrically arranged tube walls from a steam drum of a waste heat system; said cooling tubes and tube walls forming said two passages having upper annular headers connected with said steam drum through risers; said heating surface banks comprising further rectangular tube banks arranged inside said pressure vessel, said banks being arranged as feedwater preheaters having longitudinally shiftable sootblowers; hoppers arranged inside said pressure vessel for collecting dry ash from said radiation section; pressure lock means outside said pressure vessel for extracting the ash therethrough.

3. Apparatus as defined in claim 1, wherein said radiation section has heating surfaces with annularly arranged sootblowers.

* * * * *